A. B. LANG.
AUTOMOBILE LOCKING APPARATUS.
APPLICATION FILED AUG. 11, 1919.

1,382,431.

Patented June 21, 1921.
2 SHEETS—SHEET 1.

Inventor:
A. B. Lang.
by Elliott & Amun
his Att'ys.

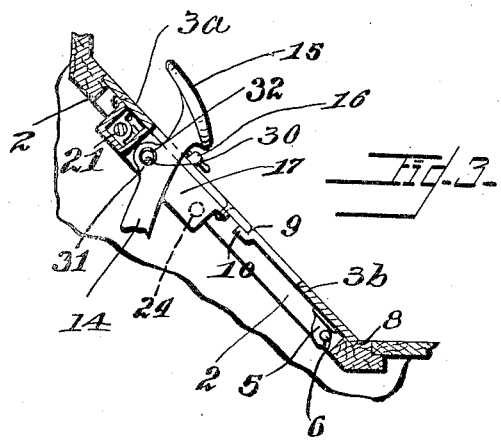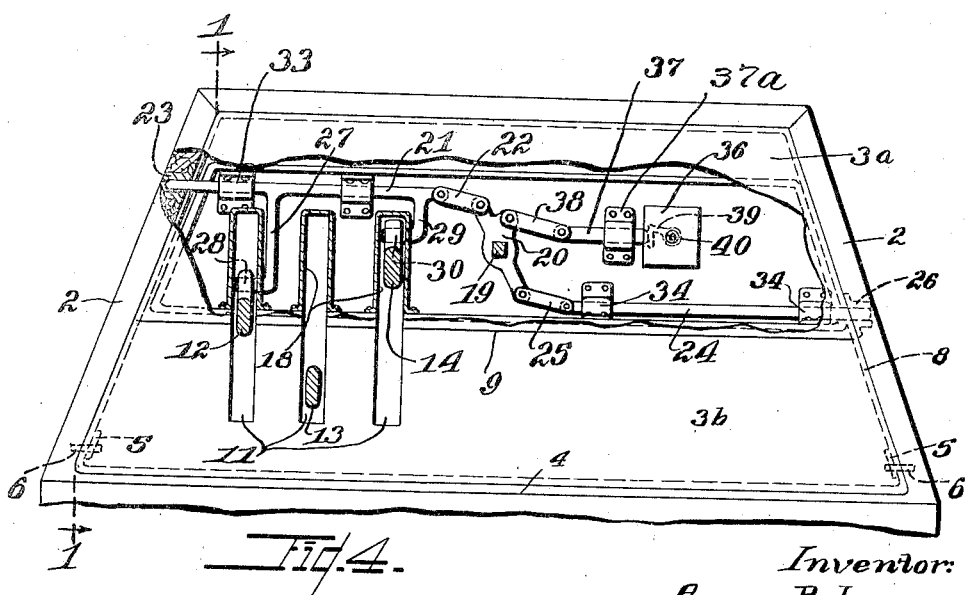

UNITED STATES PATENT OFFICE.

ALBERT B. LANG, OF ST. LOUIS, MISSOURI.

AUTOMOBILE-LOCKING APPARATUS.

1,382,431.  Specification of Letters Patent.  Patented June 21, 1921.

Application filed August 11, 1919. Serial No. 316,721.

*To all whom it may concern:*

Be it known that I, ALBERT B. LANG, a citizen of the United States, residing in the city of St. Louis and State of Missouri, have invented new and useful Improvements in Automobile-Locking Apparatus, of which the following is a specification.

This invention relates to automobile locking apparatus, and the general object of the invention is to provide simple and effective means for preventing the unauthorized use of an automobile. The police regulations or laws relating to automobiles usually prohibit the use of a lock which will operate in such a way as to prevent the pushing of the automobile a short distance along the street in case a fire or other accident should make this necessary. One of my objects has been to construct my locking apparatus in such a way that it will meet the requirements of such laws. More specifically, my general object has been to provide simple means for locking a controlling member or members against operation including a lock which must be unlocked before the controlling parts of the automobile can be operated.

The invention consists in the novel features, and in the general combination of parts to be particularly described hereinafter, all of which contribute to produce a simple and efficient automobile locking apparatus. A preferred embodiment of my invention will be particularly described in the following specification, while the broad scope of my invention will be pointed out in the appended claims.

In the drawing,

Fig. 3 is a vertical section taken about on the line 3—3 of Fig. 2, but also showing contiguous parts of the body of the automobile, certain parts being broken away; and Fig. 4 is a view similar to Fig. 2 but partially broken away so as to illustrate more fully details of the mechanism of the apparatus.

Figure 1:
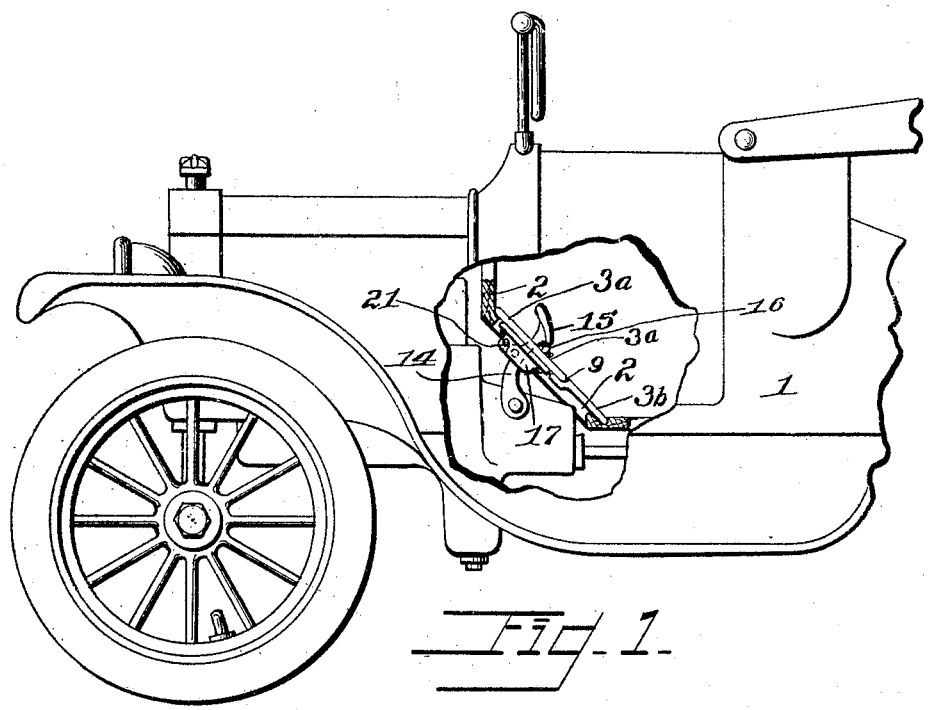
Figure 1 is a side elevation of an automobile, partially broken away to illustrate the practical application of my invention; the view shows the parts as though on a section line 1—1 of Fig. 4.

In applying my invention to an automobile, I prefer to provide a removable floor plate which I substitute for the usual floor plate through which the controlling members for the automobile are operated, and I provide means carried by this floor plate for locking one or more of these controlling members so that they cannot be operated so as to start the automobile. I also provide means for locking the floor plate in place so that it cannot be removed by an unauthorized person. The floor plate is preferably formed in two sections so constructed that when they come together they coöperate to form slots through which operating members, for example, the footh levers can be operated.

In the drawing, 1 represents an automomile of common form the body of which is provided at the usual point with a floor frame 2. In applying my invention, I provide a foot-plate 3 preferably comprising two sections 3ª and 3ᵇ which are removably seated on the floor frame 2. For this purpose, I construct one of these sections so that it will hold the other section in place, and so that it carries latching mechanism by means of which it can be latched in position and locked there so that the floor plate cannot be removed; and the latching mechanism also includes means for obstructing the path of movement when in operation, of one or more of the controlling members, such as the operating levers, for example.

Figure 2:
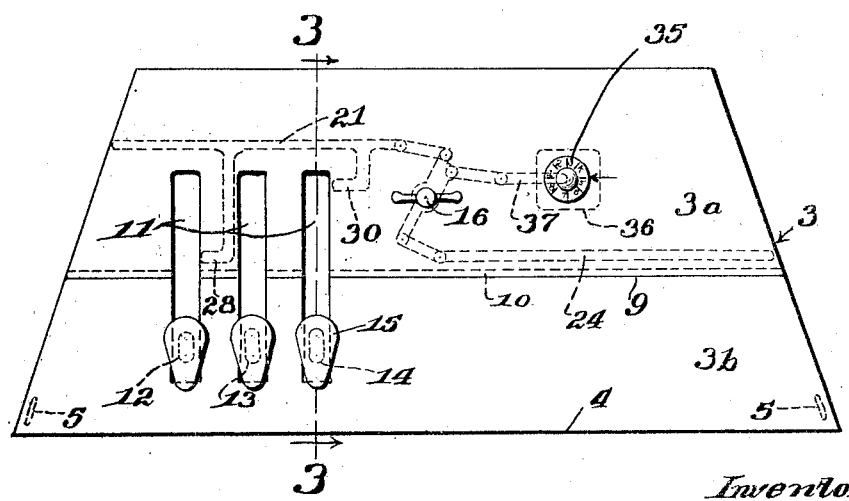
Fig. 2 is a plan of a removable floor plate which consitutes a feature of my invention, and illustrating the manner in which the latching mechanism and lock are employed.

In order to accomplish this, the floor plate section 3ᵇ is preferably provided near its lower edge 4 with engaging means 5 having sockets to engage engaging means such as pintles 6 which project from the side member of the floor frame. These engaging means 5 and 6 are readily disengageable from each other if the floor section 3ᵇ is not prevented from disengagement by the floor section 3ª. The floor frame 2 is provided with a rabbet groove 8 which receives the edges of the floor plate 3 and holds the same in place. The floor plate section 3ª prevents the section 3ᵇ from being raised because it overlaps it on its upper edge 9, (see Fig. 2), at which point the section 3ᵇ is formed with an offset flange or foot 10 which receives the lower edge of the upper section, (see Fig. 3). The two sections 3ª and 3ᵇ have corresponding notches in their adjacent edges which coöperate when the plates come together, to form slots 11 through which the operating levers 12, 13 and 14 extend. The levers terminate above the foot plate in heads 15 to be pressed by the driver's foot, enabling the levers to be operated in the usual way.

The upper section 3ª of the floor plate carries latching mechanism which operates to latch the section 3ª to the floor frame 2, and this mechanism also includes means for obstructing the path of movement of the operating foot levers.

In order to accomplish this, I prefer to provide a hand-operated rotatable part 16 which extends above the floor plate so that it can be readily rotated at will by the driver of the car. On the underside of the upper floor plate 3ª the latching mechanism is carried, the same being suitably housed in a suitable plate-form casing 17 which is formed with walls 18 forming sides for the slots 11. Within this casing 17 and on a spindle 19 actuated by the handle 16, I provide a double rocking lever or cross-head 20. To the upper end of this lever a latch bolt 21 is attached by means of a link 22 and opposite the end of this latch bolt 21 a socket 23 is provided in the side rail of the frame 2. To the other arm of the aforesaid lever a similar latch bolt 24 is connected by a link 25, and the end of this latch bolt may engage in a socket 26 in the opposite rail of the floor-frame. Fig. 4 shows the latch bolts 21 and 24 latching the floor plate to the floor frame. The bolt 21 is provided with means for obstructing the path of movement of the foot levers 12 and 14.

The lever 12 is for controlling the clutch and speed of the automobile while the lever 14 controls the brake. The bolt 21 has a lateral extending arm 27 which terminates in a pintle 28 which extends parallel with the bolt, and a similar short arm 29 is provided terminating in a similar pintle 30. These pintles 28 and 30 extend through the side walls 18 of the slots. The levers 12 and 14 are preferably provided with lugs such as the lug 31, and each of these lugs has an eye 32, which may receive the corresponding pintle. When the clutch lever 12 is held in its intermediate position, that is to say, in its idle position, its eye 32 is in line with the pintle 28 and likewise when the brake-lever 14 is in its forward position, (see Figs. 3 and 4), its eye 32 is in line with the pintle 30. When these levers are in this position, if the bolt 21 is moved toward the left, the pintles 28 and 30 will engage the eyes 32 thereby obstructing the levers so that they cannot be operated. The bolt 21 can be thrown into this locking position by rotating the handle 16. Fig. 4 shows these parts in the locking position. The bolt 21 is mounted to slide in suitable guides 33 and similar guides 34 are provided for the bolt 24. I prefer to lock the clutch lever while in its idle position because this will enable a single movement of the locking members such as bolt, 21 to lock the two levers simultaneously by a single movement.

I provide means for locking the latching mechanism in its locking or latching position, and this means preferably includes a lock such as a combination lock 35 which, if desired, may be carried on the upper face of the floor-plate section 3ª, and mounted to rotate on an axis substantially at right angles to the floor plate. The case 36 of this lock is disposed adjacent to the path of movement of the end of a tail bolt 37 which is connected by a link 38 with the aforesaid rock-lever 20 and slides in a guide 37ª. An opening in the side of the case 36 will permit the tail bolt 37 to enter if the lock is in its unlocking position. A stop 39 may project across the end of the tail bolt 37 and prevent it from moving into the case 36. This stop is operated in any suitable manner by the lock, and may be rotatably mounted on the lock spindle 40. If the combination of the lock is properly set, the stop 39 can be swung on the axis of the spindle of the lock so as to withdraw it, which will permit the tail bolt to slide into the case, thereby permitting the latching mechanism to assume the position shown in Fig. 2, at which time the pintles 28 and 30 will be withdrawn from the levers.

Any suitable lock may be used for locking the mechanism in its latching position, and I wish it understood that I do not limit myself in any way to the particular kind of lock illustrated.

Furthermore, any suitable means may be used for obstructing the path of movement of the operating levers. I prefer, however, to employ pintles such as the pintles 28 and 30, but where my invention is applied to a car already in use, I replace the ordinary foot levers by other foot levers having the lugs 31 and eyes 32 as described. In order to apply my invention to the car it is simply necessary to substitute my special foot levers, remove the floor plate of the car, and then substitute my floor plate including the two sections 3ª and 3ᵇ. In putting the floor plate in place, the section 3ᵇ is first put in position and the section 3ª is then applied so as to engage over the foot flange 10, thereby holding the section 3ᵇ in place. The floor plate sections can be readily removed when the latching mechanism is in the unlocked position, but when the latching mechanism is locked, the bolts 21 and 24 extend into the sockets 25 and 26, and lock the floor plate section 3ª against removal, at the same time, locking the operating levers of the car. As soon as the key of the lock is inserted or the combination of the combination lock 35 is properly set the stop 39 can be rotated out of the way so as to permit the tail bolt 37 to slide into the lock; then no obstruction is offered to the rocking movement of the rock lever 20, and the levers 12 and 13 can then be freed.

It is understood that the embodiment of the invention described herein is only one of the many embodiments my invention may take, and I do not wish to be limited in the practice of my invention nor in my claims, to the particular embodiment set forth.

What I claim and desire to secure by Letters Patent is:

1. In an automobile locking apparatus, the combination of a floor frame and a removable floor-plate having slots, operating levers for the automobile extending through the slots, and each capable of assuming a neutral position, latching mechanism carried on the underside of the floor-plate, including a bolt for engaging the frame at one side and having means for obstructing the movement of the operating levers of the automobile while in their neutral position, said latching mechanism also including a second bolt for engaging the frame at the other side and coöperating with the first named bolt to prevent the removal of the floor-plate, a hand-operated part mounted to rotate in the floor plate on an axis substantially at right angles thereto, for simultaneously operating both of said bolts, and a lock for locking said hand-operated part against operation.

2. In an automobile locking apparatus, the combination of a floor-plate, a clutch lever having an idle position and extending through the floor-plate, latching means for latching the floor-plate against removal, means carried on the underside of the floor-plate for engaging the clutch lever in its idle position, operating to prevent movement of the clutch lever from its idle position, and a lock coöperating with the latching means to prevent the actuation of the latching means.

3. In an automobile locking apparatus, the combination of a floor-plate, a pair of controlling levers for the automobile extending through the floor-plate, mechanism having means for latching the floor-plate against removal, a member movably mounted under the floor-plate, having means for simultaneously engaging both of said levers and operating by one and the same actuating movement of the said member to prevent actuation thereof, and a lock coöperating with the said mechanism to prevent the actuation of the same.

4. In an automobile locking apparatus, the combination of a floor-plate, a pair of controlling levers for the automobile projecting through the floor-plate, latching mechanism having means for latching the floor-plate against removal including a bolt, said bolt having means for engaging both of said levers simultaneously by one and the same actuation of the bolt and operating to prevent actuation of the controlling levers, and a lock coöperating with the latching mechanism to prevent the actuation thereof.

5. In an automobile locking apparatus, the combination of a floor frame, a floor-plate mounted therein, a pair of controlling levers for the automobile projecting through the floor-plate, a cross head mounted in the floor plate to rotate on an axis substantially at right angles thereto, a bolt connected to each end of the cross head and guided on the floor-plate, said floor frame having means for engaging the ends of said bolts to lock the floor-plate in the floor frame, and one of said bolts having means for engaging both of said controlling levers to prevent the operation thereof, and a lock coöperating with said cross head to lock the same against rotation.

6. In an automobile locking apparatus, the combination of a floor frame, a floor-plate mounted therein, a pair of controlling levers for the automobile projecting through the floor-plate, a cross head mounted in the floor-plate to rotate on an axis substantially at right angles thereto, a bolt connected to each end of said cross head and guided on the floor-plate, said floor frame having means for engaging the ends of said bolts to lock the floor plate in the floor frame and one end of said bolts having means for engaging both of said controlling levers to prevent the operation thereof, a tail bolt connected to said cross head and a lock carried by the floor-plate for preventing the movement of the tail bolt to lock said cross head.

7. In an automobile locking apparatus, the combination of a floor-frame, a floor-plate mounted therein, a controlling lever for the automobile projecting through the floor-plate, and capable of assuming a neutral position, a cross-head mounted in the floor-plate to rotate on an axis substantially at right angles thereto, a bolt connected to each end of the cross-head and guided on the floor-plate, said floor-frame having means for engaging the ends of said bolt to lock the floor-plate in the floor-frame, one of said bolts having means for engaging said lever in its neutral position to prevent movement of the same from the neutral position, and a lock coöperating with said cross-head to lock the same against rotation.

In testimony whereof, I have hereunto set my hand.

ALBERT B. LANG.